Figure 1:
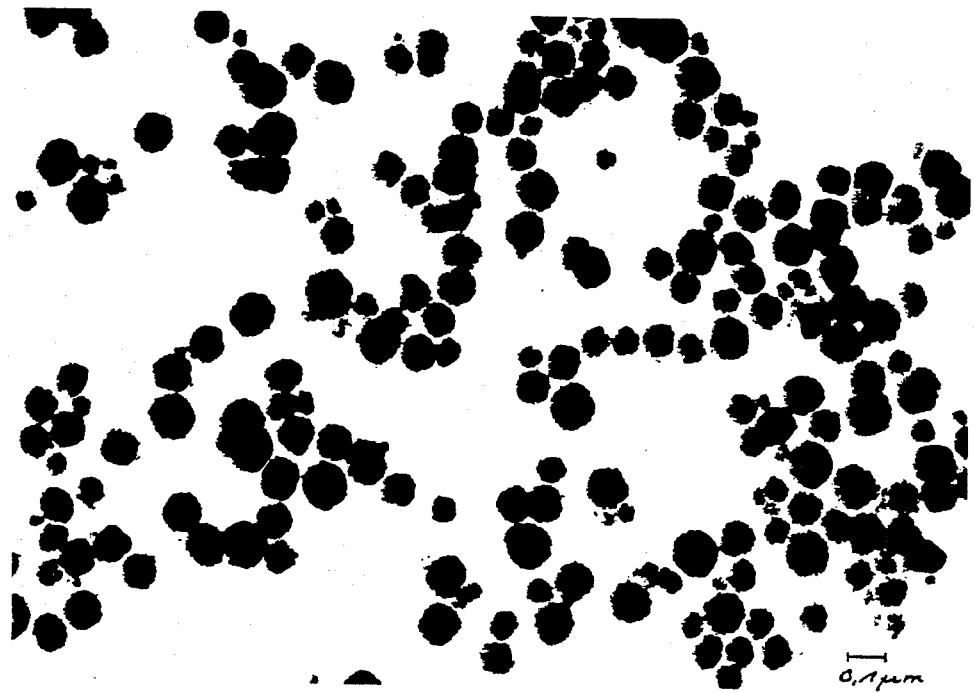

United States Patent [19]

Franz et al.

[11] Patent Number: 4,676,838
[45] Date of Patent: Jun. 30, 1987

[54] LAMELLAR IRON OXIDE PIGMENTS, A PROCESS FOR THE PRODUCTION THEREOF AND THE USE THEREOF

[75] Inventors: Gerhard Franz; Lothar Schönfelder; Heinrich Heine, all of Krefeld, Fed. Rep. of Germany

[73] Assignee: Bayer Aktiengesellschaft, Leverkusen, Fed. Rep. of Germany

[21] Appl. No.: 794,814

[22] Filed: Nov. 4, 1985

[30] Foreign Application Priority Data

Nov. 9, 1984 [DE] Fed. Rep. of Germany ....... 3440911

[51] Int. Cl.$^4$ ............................................. C04B 14/00
[52] U.S. Cl. ................................ 106/304; 106/288 R; 106/309
[58] Field of Search ..................... 106/288 R, 304, 309

[56] References Cited

U.S. PATENT DOCUMENTS

| 3,869,298 | 3/1975 | Suzuki et al. | 106/304 |
| 3,946,103 | 3/1976 | Hund | 106/304 |
| 4,404,254 | 9/1983 | Franz et al. | 106/304 |

FOREIGN PATENT DOCUMENTS

| 0014382 | 8/1985 | European Pat. Off. |
| 2056042 | 5/1971 | Fed. Rep. of Germany |
| 2508932 | 9/1976 | Fed. Rep. of Germany |
| 3124746 | 1/1983 | Fed. Rep. of Germany |

1333788 10/1973 United Kingdom.

OTHER PUBLICATIONS

Abstracts Agency of Ind. Sci. Tech(TKAK), Japanese Patent JA-089791.

Primary Examiner—Paul Lieberman
Assistant Examiner—Willie J. Thompson
Attorney, Agent, or Firm—Sprung Horn Kramer & Woods

[57] ABSTRACT

In the production of an $\alpha$-iron oxide pigment by the hydrothermal treatment of a trivalent iron-containing solution or suspension, the improvement which comprises adding to the solution or suspension prior to the hydrothermal treatment active $\alpha$-iron oxide seeds with lamellar or disc-like crystal form and a specific surface of at least 10 m$^2$/g, whereby the resulting pigment is lamellar with an Fe$_2$O$_3$ content of at least 88%, an average particle diameter of from 0.5 to 20 $\mu$m, an average ratio of diameter to thickness of from 20 to 100, and an almost normally distributed particle size distribution, the relative standard deviation of which, based on the average value of the normal distribution, is less than 0.3. The product has superior coloring properties and is used as a precursor compound for the production of lamellar magnetic pigments with superior magnetic properties.

7 Claims, 2 Drawing Figures

LAMELLAR IRON OXIDE PIGMENTS, A PROCESS FOR THE PRODUCTION THEREOF AND THE USE THEREOF

The present invention relates to lamellar α-iron oxide pigments with an $Fe_2O_3$ content of at least 88%, an average particle diameter of from 0.5 to 20 μm and an average ratio of diameter to thickness of from 20 to 100, a process for the production thereof and the use of these pigments for coloring substrates and a starting product for the production of magnetic pigments.

Lamellar pigments are used for coloring metallic effect coatings. Lamellar aluminum pigments, in particular, have already been used for a long time. In order to achieve different types of coloring effects, they must, however, be mixed with transparent coloring pigments, which is considered disadvantageous in lacquer technology, owing to the tendency to separate. Aluminum lamellae also have limited resistance to corrosion.

Pigments of lamellar crystallized haematite do not have the aforementioned disadvantages. The desirable copper-colored to red inherent coloring and the strong metallic effect of lamellar α-iron oxide are, however, only shown to advantage if the lamella geometry and chemical composition can successfully be varied independently of each other.

With the hydrothermal synthesis most frequently used for production of lamellar iron oxides, the particle diameters are successfully influenced by the selection of particular alkali concentrations (DE-OS 2 056 042). Additions of oxides of the elements of the IVth, Vth and/or VIth main group and/or of the IInd subgroup of the Periodic Table of the Elements should control the growth in thickness of the layer separately from the growth in the lamellar plane (EP-PS 14 382). By incorporating aluminum oxide in the haematite lattice, the color of the lamellae can be modified, without the particle geometry, and consequently the strength of the metallic effect can be influenced (DE-OS 3 124 746). The particle diameters can likewise only be adjusted in this process by different alkali concentrations, which, however, influence the rates of incorporation of aluminum and other foreign ions in the haematite lattice.

As a result of this large number of mutually influencing reaction parameters, substantial technical expenditure has so far been required in order to produce the whole range of products of interest. In particular, with constant properties such as dispersibility or foreign ion content, it was not possible to freely vary the particle size of the lamellae. The rates of incorporation of foreign ions are dependent on the medium in which the hydrothermal treatment is carried out. In all processes known so far, however, the particle sizes can likewise only be influenced by changing the reaction medium.

The magnetic properties of solids are substantially dependent on their chemical composition, their particle size, their particle geometry and in particular their particle size distribution. The demand for a defined influence on the particle size is consequently particularly important when the lamellar α-iron oxides are to be used as precursor compounds for the production of magnetic pigments. Furthermore, it was not possible, according to the known processes, to produce lamellar α-iron oxides with narrow particle size distribution such as are demanded in modern magnetic pigment technology.

The disadvantages of the known processes for the hydrothermal production of lamellar α-iron oxides should be prevented according to Japanese Patent Application JA 80 16 978 by a seeding process. Lamellar α-iron oxides, when themselves derive from a hydrothermal reaction, are used as seeds for the production of coarser lamellar pigment particles. This synthesis method is, however, not suitable for eliminating the described problems. On the one hand, the seed production itself is dependent on the many reaction parameters of the hydrothermal synthesis, and on the other hand only very coarse seeds and thus also only coarse end products are produced, which do not have the desired color uniformity and brightness.

Thus, the object of the present invention is to provide lamellar α-iron oxide groups which do not suffer from the disadvantage of those already known.

The demand for the lamellar α-iron oxide pigments according to the invention is met in an outstanding manner, which pigments have an $Fe_2O_3$ content of at least 88%, an average particle diameter of from 0.5 to 20 μm and an average ratio of diameter to thickness of from 20 to 100, characterized in that they have an almost normally distributed particle size distribution, the relative standard deviation of which, based on the average value of the normal distribution, is less than 0.3.

Such pigments are thereby particularly preferred which have a particle diameter of from 1 to 20 μm and an average ratio of diameter to thickness of from 20 to 60.

The α-iron oxide pigments according to the invention are obtained by hydrothermal treatment of trivalent iron-containing solutions or suspensions with addition of active α-iron oxide seeds with lamellar or disc-like crystal type.

It was surprisingly also found that the particle size of the pigments according to the invention can be influenced, within wide limits and unrelated to the type of reaction medium, when hydrothermal treatment of the iron hydroxide or the iron oxide hydroxide is carried out in the presence of particularly finely-divided crystallized α-iron oxide. It was furthermore found that when using special finely-divided α-iron oxide seed, lamellar pigments occur with the desired narrow particle size distributions.

The present invention thus also provides a process for the production of the lamellar α-iron oxide pigments according to the invention, these being obtained in a hydrothermal manner from trivalent iron-containing solutions or suspensions, active α-iron oxide seeds with lamellar or disc-like crystal type and specific surfaces of at least 10 $m^2/g$ being added to the solutions or suspensions before the hydrothermal treatment.

The seeds are active even in the smallest quantities, but they can also be used and are effectively in relatively large quantities.

In the process according to the invention, the seeds are preferably added in quantities of from 0.001 to 10% by weight, preferably from 0.005 to 5% by weight, based on the lamellar α-iron oxide pigment resulting during the hydrothermal treatment.

In principle, all those processes can be used for the production of the seeds in which α-iron oxide particles with the required properties occur. Particularly good results are achieved, however, with those lamellar α-$Fe_2O_3$-particles which result during the aging of amorphous iron(III)-hydroxide at elevated temperature in the presence of oxalate ions.

When this aging of the amorphous iron(III)-hydroxide to $\alpha$-Fe$_2$O$_3$ is undertaken in suspensions which in addition contain calcium ions, seeds occur which have a particularly outstanding effect in the hydrothermal synthesis of coarse pigments according to the invention.

The process for the production of the $\alpha$-Fe$_2$O$_3$ seeds from iron(III)-hydroxide takes place in detail as follows: starting compounds are iron(III) salts, which are dissolved without residue in water, optionally with addition of small quantities of acids. The concentrations are selected such that, on the one hand, high space-time-yields are achieved, but on the other hand, however, the viscosities during precipitation do not increase too substantially. Good results are achieved, for example, with concentrations of 0.25 mol/l using iron(III) sulphate, nitrate or chloride.

The precipitation of the amorphous hydroxide takes place by addition of a soluble alkaline-reacting compound, preferably of alkali hydroxide, alkali carbonate or ammonia. The precipitation can be undertaken quickly with intensive stirring or also by dropwise addition of the precipitation reagent. After completion of the precipitation, the pH of the hydroxide suspension should not be above 11.

For converting the amorphous iron(III) hydroxide into crystalline finely-divided $\alpha$-Fe$_2$O$_3$, the suspension must be subjected to a temperature treatment (aging). A fast and complete crystallization of $\alpha$-Fe$_2$O$_3$, with the most far-reaching elimination of $\alpha$-FeOOH, is achieved when the suspension contains oxalate ions in concentrations of from 0.001 to 0.5 mol/l and has a pH of from 7 to 11. The regulation of the oxalate concentration can take place before or after the hydroxide precipitation by addition of the corresponding quantities of oxalic acid or alkali oxalates. It is even possible to first separate freshly precipitated iron(III) hydroxide from the mother liquor and then to subject it to aging after resuspending in oxalate-containing solution.

The temperature treatment of the hydroxide suspension must be continued until the amorphous hydroxide is converted into X-ray crystalline $\alpha$-Fe$_2$O$_3$. The reaction time, apart from being dependent on the oxalate concentration, is above all dependent on the temperature. At 70° C., times of about 24 h are required, at 150° C. the reaction already runs its complete course under pressure in 1 hour.

For the production of particularly active seeds, calcium ions in the form of soluble calcium compounds are additionally added to the starting solution or suspension before or after the hydroxide precipitation, preferably in quantities of from 0.1 to 1 mol per mol of $\alpha$-iron oxide produced.

If the finely-divided $\alpha$-Fe$_2$O$_3$ is further used after aging as a seed for hydrothermal synthesis, then the working-up only takes place by decanting and resuspending several times; the product is then used in a moist state.

Figure 2:
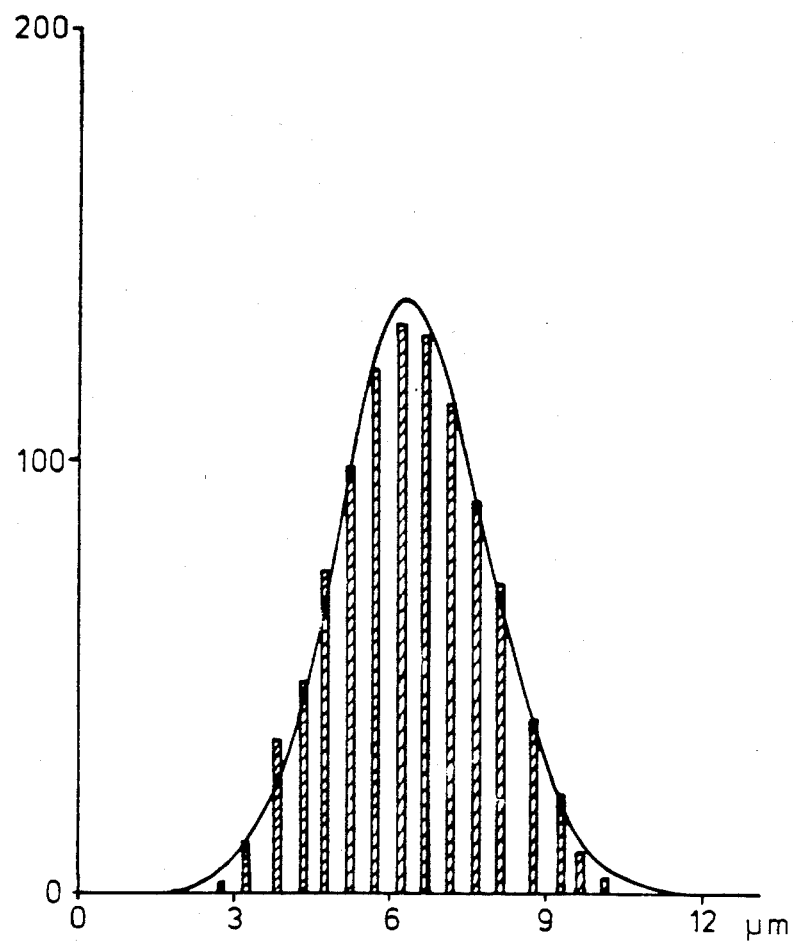

The invention will be further described with reference to the accompanying drawings wherein:

FIG. 1 is an electron photomicrograph showing many individual seed particles in accordance with the invention; and FIG. 2 is a curve showing the particle size distribution of a typical lamellar iron oxide particle according to this invention.

The seeds are uniformly crystallized in the crystal lattice of the haematite. As typical properties, the individual particles have a very even lamellar to disc-like crystal nature which is clearly recognized in electron microscope photographs (FIG. 1). The particle diameters are about 0.1 $\mu$m. The specific surface, determined according to the BET method, is always greater than 10 m$^2$/g, particularly active seeds having surfaces of from 15 to 100 m$^2$/g.

In a further embodiment of the process according to the invention, those particles of $\alpha$-iron oxide are used as seeds which, as known from U.S. Pat. No. 398,130, corresponding to DE-OS 22 49 274, result during the oxidation of iron(II)-hydroxide with air in the presence of seed modifying additives.

The seeds thus produced have a large surface and a predominantly haematite structure. The specific surfaces may vary in wide ranges of from 10 to 140 m$^2$/g. Furthermore, the finely-divided products with surfaces >40 m$^2$/g described in DE-OS 2 508 932 have a particularly good seed effect in the hydrothermal synthesis of lamellar iron oxides. They consist of mainly disc-like particles in the size range of below 0.1 $\mu$m.

Finely-divided $\alpha$-Fe$_2$O$_3$ seeds produced according to the known processes, with BET surfaces of greater than 10 m$^2$/g, have a substantial seed effect in the hydrothermal synthesis of $\alpha$-iron oxide pigments, and the particles of $\alpha$-Fe$_2$O$_3$ newly formed from iron(III)-hydroxide or -oxide hydroxides thereby grow on such finely crystalline seed particles. The properties of the end product are thus not only determined by the known parameters of the hydrothermal synthesis, but rather by the type and quantity of seed.

The following method is used for testing the seed effect:

A ferrite yellow ($\alpha$-FeOOH), technically produced according to the precipitation process, is suspended in concentrated sodium hydroxide solution. After addition of seeds in quantities of from 0.001 to 10%, based on FeOOH, the suspension is subjected to a hydrothermal treatment at 200° C. After 4 h, the FeOOH used is completely converted to lamellar $\alpha$-Fe$_2$O$_3$.

Without addition of seeds, a dark violet red product occurs under these conditions, consisting of lamellar crystals with diameters of 20 $\mu$m and above. The lowest possible active seed quantities of 0.001% bring about a reduction in the average particle diameter to values up to 20 $\mu$m and a change in color to the desired light copper-colored tones. With increasing seed quantities, the products become increasingly finely-divided, and the particle diameters fall with quantities of 10% to values of from 0.5 to 1 $\mu$m. All product have light, metallic brilliant colors with color purities which are clearly above the lvel of comparable lamellar $\alpha$-iron oxides, produced, however, without the addition of seeds. When measuring the color values in the CIELab color system (DIN 6174), these facts are expressed by high values for the metric lightness L* (brightness) and the metric chroma C*$_{ab}$ (color purity).

Products with an outstanding metallic effect and very high brightness are obtained with from 0.05 to 1% of seeds. These conditions are thus particularly suitable for the production of pigments for decorative coloring.

A further object of this invention is thus the use of lamellar $\alpha$-iron oxide pigments according to the invention for coloring decorative substrates and coatings of lacquers, plastics and enamel.

Finely-divided $\alpha$-iron oxide is required as starting material for the production of lamellar magnetic iron oxides or iron particles. It can be produced from technical iron oxide hydroxides by hydrothermal reaction with a relatively high seed quantity and/or relatively low alkali concentration.

The lamellar particles, about 1 μm in size, can be reduced to magnetite or metallic iron while maintaining the shape thereof, or converted by reduction and subsequent oxidation to maghaemite ($\gamma$-$Fe_2O_3$).

The lamellar $\alpha$-iron oxide pigments according to the invention are thus particularly suitable for use as starting material for the production of lamellar magnetic particles or magnetic, maghaemite or bertholoid phases of the composition $Fe_{3-x}O_{4-x}$, x having a value of from 0 to 1.

All pigments according to the invention have a narrow particle size distribution. The particle size is understood to mean the diameter of a circle which circumscribes the mostly hexagonal lamellar plane. For determining this diameter, photographs of the samples are produced with a scanning electron microscope (SEM) with 1,000 to 10,000—fold magnification. Evaluation takes place with an image analysis apparatus by going round the particle contours. In this manner, about 1,000 individual particles are measured from each sample. In FIG. 2, a diameter distribution (histogram) is given of a typical product and compared with a Gaussian normal distribution.

For quantitative evaluation, a Gaussian normal distribution is adapted to the measured values and the average value d and standard deviation $\sigma$ are determined from this curve. The pigments according to the invention are characterized by the fact that the relative standard deviation based on the average value, that is the value of $\sigma/d$, is at most 0.3. It is thus substantially smaller than with conventional products ($\geq 0.4$). A visible characteristic of a narrow particle size distribution of this type is the high brightness and color purity of the products.

The invention will now be explained by means of examples, without the invention thereby being limited.

EXAMPLE 1

0.25 mol of $Fe(NO_3)_3.9H_2O$ are dissolved in 700 ml of water and iron(III)-hydroxide is precipitated by addition of 2.5N KOH over 30 min. The pH after precipitation is 9. 0.05 mol of oxalic acid dihydrate are added to the suspension and dissolved. The pH is readjusted to 9 by further KOH. The suspension is placed in an autoclave and subjected to a hydrothermal treatment for 3.5 h at 120° C. The original red brown precipitate of amorphous iron hydroxide is thereby converted to finely-divided lamellae of crystalline $\alpha$-iron oxide. Purification of the solid then takes place by decanting several times. The seed thus obtained is kept in suspension.

Varying quantities of the seed suspension are added to a substantially alkaline suspension of $\alpha$-iron oxide hydroxide, which has been produced by oxidizing $FeSO_4$ with air in a 2-stage process and which has a BET surface of 15 m²/g. The alkali concentration is thereafter 8N NaOH. A 4-hour hydrothermal treatment of the suspension at 200° C. then takes place, during which the $\alpha$-iron oxide hydroxide is converted to lamellar $\alpha$-iron oxide. After filtering, washing and drying, the pigments are worked into a commercial alkyd resin with a pigment-volume-concentration of 10%. The color values measured in the CIELab color systm are set out in Table 1.

The BET surfaces of the products, the average lamella thicknesses which are calculated from the BET surface, and the particle diameters determined approximately from the electron microscope photograph, are also set out in the table. The values clearly show how the particle sizes and color properties of the products can be influenced by varying the seed quantities.

TABLE 1

| Seed quantity (%) | Experimental results of Example 1 | | | | | | |
|---|---|---|---|---|---|---|---|
| | CIELAB value | | | | BET surface (m²/g) | h[1] (μm) | d[2] (μm) |
| | L* | a* | b* | c*$_{ab}$ | | | |
| 0.01 | 46.8 | 11.6 | 3.5 | 12.1 | 1.1 | 0.35 | 12.0 |
| 0.02 | 48.0 | 12.9 | 4.5 | 13.7 | 1.3 | 0.29 | 9.5 |
| 0.05 | 49.8 | 14.8 | 6.2 | 16.1 | 1.9 | 0.20 | 7.0 |
| 0.10 | 49.9 | 15.1 | 7.0 | 16.7 | 2.3 | 0.17 | 5.5 |
| 0.50 | 47.1 | 14.3 | 6.7 | 15.8 | 4.1 | 0.093 | 3.5 |
| 1.0 | 42.2 | 13.7 | 6.0 | 15.0 | 4.2 | 0.091 | 2.5 |
| 2.0 | 39.9 | 14.9 | 6.2 | 16.1 | 5.0 | 0.076 | 2.0 |
| 5.0 | 39.0 | 17.6 | 8.1 | 19.3 | 5.4 | 0.071 | 1.0 |
| blank experiment without seed | 41.8 | 5.9 | −0.4 | 5.9 | | | |

[1]Lamella thickness calculated from BET surface
[2]Lamella diameter estimated from SEM photographs

EXAMPLE 2

Example 1 is repeated in all details, except that during the seed production, 0.05 mol of calcium ions in the form $Ca(NO_3)_2.4H_2O$ are added before the precipitation of $Fe(OH)_3$.

The results of the series of experiments are set out in Table 2. The effect of the calcium-containing seeds is stronger than that of the calcium-free seeds. In particular, pigments which are lighter and purer in color can be produced with these seeds, which pigments can be used particularly well for metallic effect coloring.

TABLE 2

| Seed quantity | Experimental results of Example 2 | | | | | | |
|---|---|---|---|---|---|---|---|
| | CIELAB values | | | | BET surface (m²/g) | h[1] (μm) | d[2] (μm) |
| | L* | a* | b* | c*$_{ab}$ | | | |
| 0.01 | 46.7 | 12.3 | 8.1 | 14.7 | 1.3 | 0.29 | 13.0 |
| 0.02 | 50.4 | 14.0 | 11.2 | 17.9 | 1.7 | 0.22 | 10.5 |
| 0.05 | 51.8 | 15.7 | 12.5 | 20.0 | 2.5 | 0.15 | 8.0 |
| 0.10 | 52.4 | 16.6 | 13.8 | 21.6 | 3.3 | 0.12 | 6.5 |
| 0.50 | 54.8 | 17.4 | 18.6 | 25.5 | 4.5 | 0.085 | 3.5 |
| 1.0 | 52.9 | 16.6 | 19.0 | 25.3 | 5.3 | 0.072 | 2.5 |
| 2.0 | 50.5 | 16.4 | 18.8 | 24.9 | 5.7 | 0.067 | 2.0 |
| 5.0 | 44.9 | 18.5 | 17.1 | 25.5 | 6.8 | 0.056 | 1.5 |

[1]Lamella thickness calculated from BET surface
[2]Lamella diameter estimated from SEM photographs

EXAMPLE 3

The production of the seed again takes place analogously to Example 1. The starting solution contains 144 g of $Fe(NO_3)_3.9H_2O$ and 5.9 g of $Ca(NO_3)_2$ in 700 ml of water. The precipitation of $Fe(OH)_3$ is effected with KOH up to a pH of 9; 6.2 g of oxalic acid dihydrate are added and the pH is readjusted to 9. The conversion of the amorphous $Fe(OH)_3$ to crystalline lamellae of $\alpha$-$Fe_2O_3$ takes place by boiling the suspension for 3 h. The seeds produced according to this method have a BET surface of 24 m²/g. Round lamellar to disc-like particles with a very narrow diameter distribution of from 0.06 to 0.1 μm can be seen in SEM photographs.

The seeds are added in varying quantities to alkaline suspensions of $\alpha$-iron oxide hydrate, which is produced by oxidizing $FeSO_4$ with air, and which has an X-ray measured crystallite size of 150 A. The alkali concentration is 8N NaOH, and the FeOOH concentration is 50 g/l. A 4-hour hydrothermal treatment at 200° C. then takes place, which leads to the conversion of α-iron oxide hydroxide to α-iron oxide. The products are filtered, washed and dried. The color values are determined as described in Example 1. The distributions of the particle diameters (FIG. 2) are determined from SEM photographs and are set out in Table 3. The products show the narrow particle size distribution according to the invention and a parallel high color purity, which is shown by the high values for L* and c*$_{ab}$.

TABLE 3

Experimental results of Example 3

| Seed quantity (%) | average diameter | standard deviation ζ | BET surface ([m²/g]) | h (from BET) [μm] | ζ/d | d | L* | a* | b* | c*$_{ab}$ |
|---|---|---|---|---|---|---|---|---|---|---|
| 0.01 | 9.5 | 2.1 | 1.1 | 0.35 | 0.22 | | 46.8 | 12.7 | 5.2 | 13.7 |
| 0.05 | 7.2 | 1.7 | 1.8 | 0.21 | 0.24 | | 48.8 | 16.0 | 8.2 | 18.0 |
| 0.10 | 6.4 | 1.4 | 2.6 | 0.15 | 0.22 | | 50.9 | 18.8 | 11.1 | 21.9 |

EXAMPLE 4

The precipitation of the iron(III)-hydroxide takes place analogously to Example 1. The suspension of Fe(OH)$_3$ is divided and subjected to different thermal treatments (24 h at 70° C., 5 h at 100° C., 2 h under pressure at 120° C., 2 h under pressure at 250° C.). After this treatment, seeds of α-iron oxide with BET surfaces of 106, 53, 21 and 13.1 m²/g are obtained. The effectiveness of these seeds in the hydrothermal conversion of α-iron oxide hydroxide to lamellar α-iron oxide are variable (Table 4); the seed produced at 250° C. has the smallest effect; the products with the purest color are obtained with the seed produced at 120° C.

TABLE 4

Experimental results of Example 4

| BET surface of the seed m²/g | Seed quantity % | CIELab values of the α-iron oxide |  |  |  |
|---|---|---|---|---|---|
| | | L* | a* | b* | c*$_{ab}$ |
| 106 | 0.05 | 45.6 | 10.5 | 4.4 | 11.4 |
| 53 | 0.05 | 46.2 | 11.0 | 5.0 | 12.1 |
| 21 | 0.05 | 48.3 | 13.7 | 6.8 | 15.3 |
| 13.1 | 0.05 | 40.5 | 6.9 | 1.4 | 7.0 |
| Blank experiment | | 39.7 | 5.6 | 1.1 | 5.7 |

EXAMPLE 5

The standard procedure described in Examples 1 to 4 is deviated from in the seed production. The oxalic acid quantities, the pH, the type of iron(III) compound, the type of alkali as well as the temperature and time of the thermal treatment are varied. The individual experimental parameters are set out in Table 4. The testing of the seeds takes place according to the standard process described in Example 3 with 0.05% and 0.1% of seed based on FeOOH. With weakly active seeds, the color values of the lamellar iron oxides are only slightly different from those of the product from the blank experiment; with very good effectiveness, brightness values L* of greater than 50 are measured.

TABLE 5

Experimental results of Example 5
Seed production

| iron (III) compound | quantity (g) of oxalic acid | pH | Temperature °C. | Time h | Other additives | seed effect with hydrothermal treatment[2] |
|---|---|---|---|---|---|---|
| Nitrate | 0.63 | 7 | 70 | 24 | — | w |
| Nitrate | 6.3 | 7 | 70 | 24 | — | a |
| Nitrate | 0.63 | 9 | 70 | 24 | — | st |
| Nitrate | 6.3 | 9 | 70 | 24 | — | st |
| Nitrate | 0.63 | 11 | 70 | 24 | — | w |
| Nitrate | 6.3 | 11 | 70 | 24 | — | w |
| Sulphate | 6.3 | 9 | 70 | 24 | — | st |
| Chloride | 6.3 | 9 | 70 | 24 | — | a |
| Nitrate | 6.3 | 9 | 100 | 3 | — | st |
| Nitrate | 6.3 | 9 | 150 | 1 | — | st |
| Nitrate | 31.5 | 9 | 70 | 24 | — | w |
| Nitrate | 63 | 9 | 70 | 24 | — | vw |
| Nitrate | 9.2 | 9 | 70 | 24 | potassium oxalate instead of oxalic acid | a |
| Nitrate | 6.3 | 9 | 70 | 24 | NaOH instead of KOH | a-st |

[1] All experiments with 0.25 mol of Fe
[2] vw = very weak; w = weak; a = average; st = strong

EXAMPLE 6

Red iron oxide pigments with varying BET surfaces are produced according to the 2-stage process described in U.S. Pat. No. 398,130 corresponding to DE-OS 22 49 274 and 25 08 932. Disc-like or lamellar particles of α-iron oxide with a diameter of at most 0.1 μm are obtained in all cases. The products are used as seeds in the hydrothermal synthesis of lamellar α-Fe$_2$O$_3$. In addition, a α-iron oxide hydroxide produced according to the aniline process (BET surface 28 m²/g, 1.3% of SiO$_2$) is suspended in 8N NaOH. From 0.0025 to 0.5% by weight of α-Fe$_2$O$_3$ seed are added to this suspension. The solids concentration is thereafter 50 g/l. The suspension is heated in a laboratory stirring autoclave for 15 min to 260° C. and then quickly cooled. The lamellar α-iron oxide is worked up in the usual manner. The color values of the products are set out in Table 6. The effect of the seeds on the product properties, especially on the increase in brightness L* and color c*$_{ab}$, can be clearly seen.

TABLE 6

| Seed quantity % | BET seed | BET product | CIELAB values |  |  |  |
|---|---|---|---|---|---|---|
| | | | L* | a* | b* | c*$_{ab}$ |
| 0.0025 | 75 | — | 46.8 | 8.8 | 13.1 | 15.8 |
| 0.01 | 75 | — | 48.0 | 9.1 | 13.2 | 16.0 |
| 0.05 | 75 | — | 53.2 | 10.5 | 12.1 | 16.0 |
| 0.5 | 125 | 11.3 | 51.7 | 13.9 | 14.2 | 19.8 |
| 0.5 | 98 | 11.1 | 53.3 | 13.6 | 14.4 | 19.8 |
| 0.5 | 75 | 10.7 | 54.6 | 12.9 | 14.6 | 19.5 |

It will be understood that the specification and examples are illustrative but not limitative of the present invention and that other embodiments within the spirit and scope of the invention will suggest themselves to those skilled in the art.

We claim:

1. Lamellar pigments consisting of α-iron oxide with an $Fe_2O_3$ content of at least 88%, an average particle diameter of from 0.5 to 20 μm, an average ratio of diameter to thickness of from 20 to 100, and an almost normally distributed particle size distribution, the relative standard deviation of which, based on the average value of the normal distribution, is less than 0.3.

2. Lamellar α-iron oxide pigments according to claim 1, having a particle diameter of from 1 to 20 μm and an average ratio of diameter to thickness of from 20 to 60.

3. In the production of an α-iron oxide pigment by the hydrothermal treatment of a trivalent iron-containing solution or suspension, the improvement which comprises adding to the solution or suspension prior to the hydrothermal treatment active α-iron oxide seeds with lamellar or disc-like crystal form and a specific surface of at least 10 m²/g, whereby the resulting pigment is lamellar with an $Fe_2O_3$ content of at least 88%, an average particle diameter of from 0.5 to 20 μm, an average ratio of diameter to thickness of from 20 to 100, and an almost normally distributed particle size distribution, the relative standard deviation of which, based on the average value of the normal distribution, is less than 0.3.

4. The process according to claim 3, wherein the seeds are added in from 0.001 to 10% by weight based on the lamellar α-iron oxide pigment resulting from the hydrothermal treatment.

5. The process according to claim 4, wherein the seeds are obtained by thermal treatment of iron(III)-hydroxide in an aqueous suspension which is from 0.001 to 0.5 molar in oxalate ions, at a pH of from 7 to 11 and at a temperature from 70° to 250° C.

6. The process according to claim 5, wherein during seed production calcium ions are present in from 0.1 to 1 mol per mol of resulting α-iron oxide seed.

7. The process according to claim 4, wherein the seeds are produced by the oxidation of iron(II)-hydroxide with air in the presence of a seed modifying additive.

* * * * *